United States Patent [19]

Akesson et al.

[11] Patent Number: 5,692,433
[45] Date of Patent: Dec. 2, 1997

[54] APPARATUS FOR DOSING A PATTERN OF FOOD MATERIAL

[75] Inventors: Rune Akesson, Hyllinge; Jan Erlandsson; Giuliano Pegoraro, both of Bjuv, all of Sweden

[73] Assignee: Nestec S.A., Vevey, Switzerland

[21] Appl. No.: 641,168

[22] Filed: Apr. 30, 1996

[30] Foreign Application Priority Data

May 9, 1995 [EP] European Pat. Off. ......... 95 201 190.6

[51] Int. Cl.⁶ .................. A21C 9/04; B29F 3/01; B29F 3/04
[52] U.S. Cl. ................. 99/450.4; 99/450.1; 99/494
[58] Field of Search .................. 99/494, 516, 534, 99/536, 487, 452, 453, 352, 450.1–450.7; 222/207–212, 643, 321.6, 380

[56] References Cited

U.S. PATENT DOCUMENTS

| | | | |
|---|---|---|---|
| 3,937,135 | 2/1976 | Pratolongo | 99/352 |
| 4,502,376 | 3/1985 | Cossé | 99/450.4 |
| 4,587,894 | 5/1986 | Horig | 99/487 |
| 4,615,264 | 10/1986 | Rose | 99/450.4 |
| 4,708,054 | 11/1987 | Newbery et al. | 99/450.4 |
| 4,862,933 | 9/1989 | Gies | 99/452 |
| 5,000,353 | 3/1991 | Kostanecki et al. | 222/207 |
| 5,078,097 | 1/1992 | Chisholm | 222/643 |
| 5,253,788 | 10/1993 | Vandromme et al. | 222/321.6 |
| 5,265,654 | 11/1993 | Larsen | 222/450 |
| 5,419,464 | 5/1995 | Ganrot et al. | 222/380 |
| 5,498,286 | 3/1996 | Milohanic | 99/450.1 |

FOREIGN PATENT DOCUMENTS

| | | |
|---|---|---|
| 0 069 929 | 1/1983 | European Pat. Off. . |
| 0 189 299 | 7/1986 | European Pat. Off. . |
| 1 450 374 | 9/1976 | United Kingdom . |
| 2 222 152 | 2/1990 | United Kingdom . |
| 2 237 116 | 4/1991 | United Kingdom . |

*Primary Examiner*—Timothy F. Simone
*Attorney, Agent, or Firm*—Pennie & Edmonds

[57] ABSTRACT

The invention relates to an apparatus and a method for dosing a pattern of food material onto an object e.g. a tray or other food material continuously moved. The apparatus comprises a dosing assembly comprising a substantially cylindrical tube element having a plurality of circumferential openings defining the pattern and being mounted rotatably; and a hollow core element with at least one supply inlet and at least one discharge orifice, the core element being positioned substantially in the tube element with the discharge orifice facing downwardly, so that when the tube element is rotated about its longitudinal axis the openings are in turn aligned with and brought adjacent to the discharge orifice allowing food material introduced into the core element to be discharged through the opening created. The apparatus further comprises supply means for the supply of the food material to the core element and supply controlling means for controlling said supply, drive means for rotating the tube element about its longitudinal axis, and control means for controlling the rotation of the tube element so that the pattern is correctly dosed onto the moved object.

7 Claims, 4 Drawing Sheets

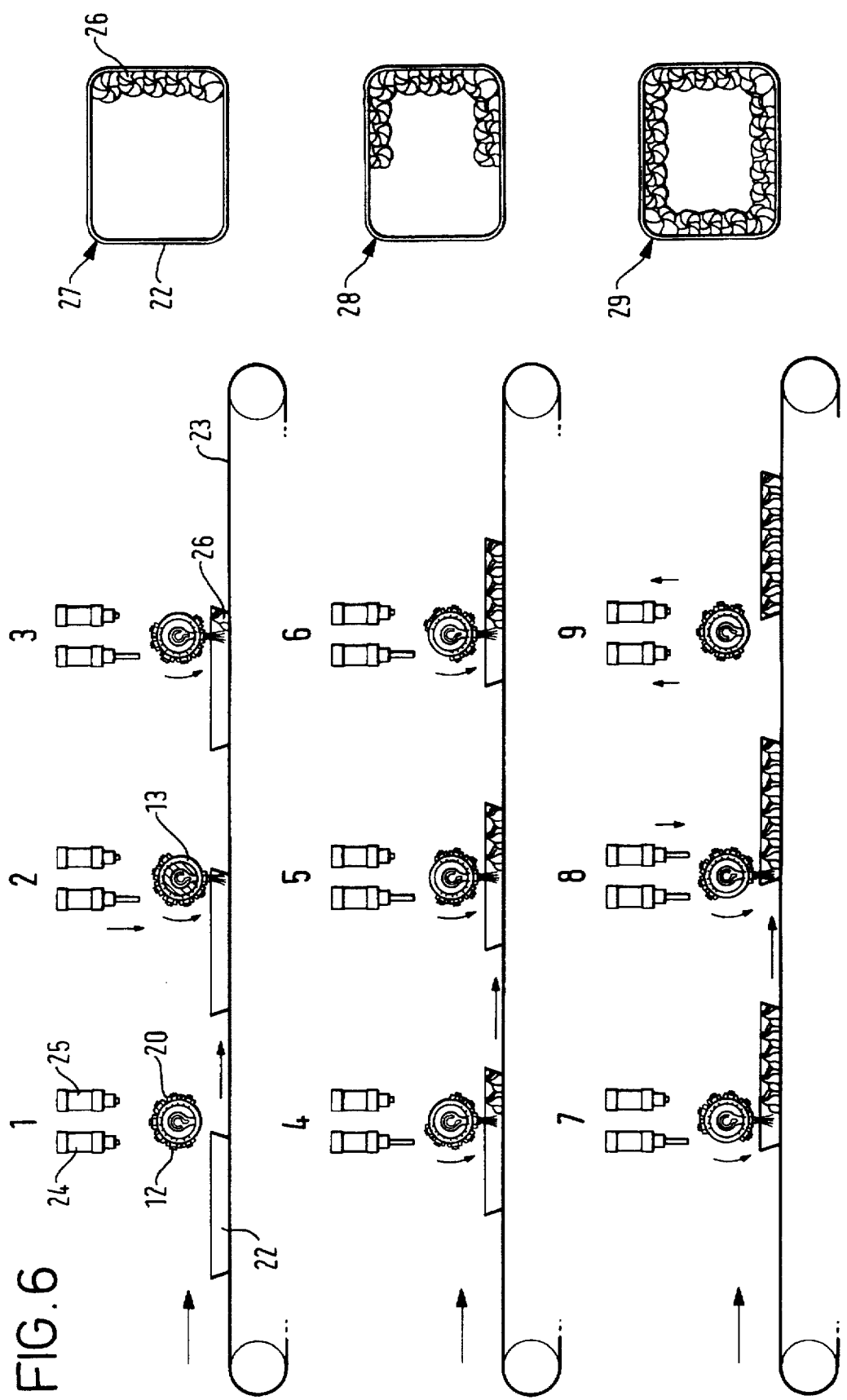

APPARATUS FOR DOSING A PATTERN OF FOOD MATERIAL

TECHNICAL FIELD

The present invention relates to an apparatus for dosing a pattern of food material onto an object e.g. a tray, foodstuff such as cakes, ice cream etc. moved continuously relative to the apparatus, and to a method for dosing a pattern of food material onto such a moving object.

BACKGROUND ART

Decoration of foodstuff or filling of trays with patterns of food material is usually a very laborious job. In the food producing industry this is therefore frequently performed by automated machines passing the trays or foodstuff through dosing stations. However, obtaining an attractive "hand made" appearance is difficult especially if the tray or foodstuff to be filled or decorated is continuously in motion.

There is often utilised a template dosing system where the food material is dosed through a horizontally mounted plane template defining the pattern which is dosed onto trays or foodstuff which is moved beneath the dosing station.

The disadvantage of the template system is, however, that the objects to be decorated or filled are halted while the application of the food material is conducted. This kind of discontinuous advancing of trays or foodstuff is undesirable as it slows the decorating operation and results in high production costs. Furthermore, such a discontinuous process is undesirable as it vibrates the product advanced.

A further drawback with the template dosing system is that a shift of the pattern requires change of the template. This is a time consuming task as the template generally is positioned as a bottom plate in the dosing chamber. Consequently, the chamber will have to be emptied before a change of template is possible.

SUMMARY OF THE INVENTION

The present invention provides an apparatus which enables dosing of a pattern of food material to a continuously transported tray or foodstuff and thus a rapid filling decoration and advancing of tray or foodstuff is achieved.

The invention may advantageously be used for decorating trays containing viscous food material as the continuous dosing and advancing of the trays provides a minimum of vibration of the food product.

The invention also provides the possibility of obtaining an attractive "hand made" appearance of the final product though the tray or foodstuff moves continuously.

An additional advantage is that the invention facilitates the changing of dosing pattern and cleaning of dosing assembly.

The invention also relates to a method for such an application or dosing of food material pattern offering these advantages. Furthermore, the invention relates to a tray or food product decorated in accordance with the method of the invention or by means of the apparatus according to the invention.

In a first aspect, the present invention relates to an apparatus for dosing a pattern of food material onto an object continuously moved relative to the apparatus. This apparatus includes a dosing assembly comprising a substantially cylindrical tube element having a plurality of circumferential openings defining the pattern and being mounted rotatably; and a hollow core element with at least one supply inlet and at least one discharge orifice, the core element being positioned substantially in the tube element with the discharge orifice facing downwardly, so that when the tube element is rotated about its longitudinal axis the openings are in turn aligned with and brought adjacent to the discharge orifice allowing food material introduced into the core element to be discharged through the opening created, supply means for the supply of the food material to the core element and supply controlling means for controlling said supply, drive means for rotating the tube element about its longitudinal axis, and control means for controlling the rotation of the tube element so that the pattern is correctly dosed onto the moved object.

The openings in the tube element may define any pattern with the only limitations being the dimensions of the tube element.

It should be understood that during one rotation of the tube element a single pattern may be dosed onto one tray or alternatively one rotation may provide a number of subsequent patterns dosed on subsequent trays. The patterns may be identical or vary. Likewise, a pattern dosed onto one tray may consist of a sequence of repeated patterns.

The rotation of the tube element may be continuous or intermittent. For example, the tube element may be halted in one position while part of the pattern is dosed onto the tray moving beneath the tube element in order to subsequently be rotated resulting in a combination pattern comprising both lines and patterns.

In a preferred embodiment, the core element is a cylindrical sleeve substantially coaxially fitted within the tube element. This provides a very simple construction which is simple to manufacture and eases the cleaning operation of the dosing assembly.

An additional advantage obtained with this design is that the tube element defining the pattern to be dosed can easily be changed. Hence, the pattern can easily be changed.

Conveniently, the discharge orifice is an elongated slot extending substantially along the longitudinal axis of the tube element. Alternatively, the discharge orifice may be a plurality of openings being able to match the openings in the tube element.

The transporting of the objects beneath the assembly is carried out by conveyor means. For example, the objects are advanced at a substantially right angle to the longitudinal axis of the tube element and in a substantially vertical plane.

The openings in the tube element may define one pattern to be dosed onto a tray or a plurality of patterns in turn to be dosed onto trays advanced beneath the dosing assembly.

In a preferred embodiment according to the invention, openings in the tube element are arranged so that the pattern is a substantially rectangular border. Preferably, only part of the periphery has openings as this allows a pause between the dosing sequences e.g. allowing one tray to be moved away and a new tray to be forwarded.

A very attractive "hand made" appearance was obtained when the openings in the tube element were provided with a nozzle, respectively, defining the shape of the dosed food material. The nozzles may e.g. have saw toothed discharge openings in order to shape the food material discharged into "duchesse" tops. Other contours may be provided to give other finishes. Again it is convenient if the openings cover only part of the periphery as this allows the decorated tray or food material room beneath the tube element.

In a second aspect, the invention provides a method for dosing a pattern of food material onto an object continuously moved. This method includes the steps of transporting the object beneath a dosing assembly comprising a substantially cylindrical tube element having a plurality of circumferential openings defining the pattern and being mounted rotatably; and a hollow core element with at least one supply inlet and at least one discharge orifice, the core element being positioned substantially in the tube element with the discharge orifice facing downwards, so that when the tube element is rotated about its longitudinal axis the openings are in turn aligned with and brought adjacent to the discharge orifice allowing food material introduced into the core element to be discharged through the opening created, supplying and controlling the supply of the food material to the core element, while rotating the tube element about its longitudinal axis to cause the food material to be dosed from the dosing assembly, and controlling the rotation of the tube element so that the pattern is correctly dosed onto the object moved beneath the assembly.

BRIEF DESCRIPTION OF THE DRAWINGS

The invention will now be further described with reference to the drawings showing preferred embodiments of the apparatus and the method according to the invention.

FIG. 6 illustrates the steps involved in the decoration of a tray with the method or apparatus according to the invention.

DETAILED DESCRIPTION OF THE PREFERRED EMBODIMENTS

Figure 1:
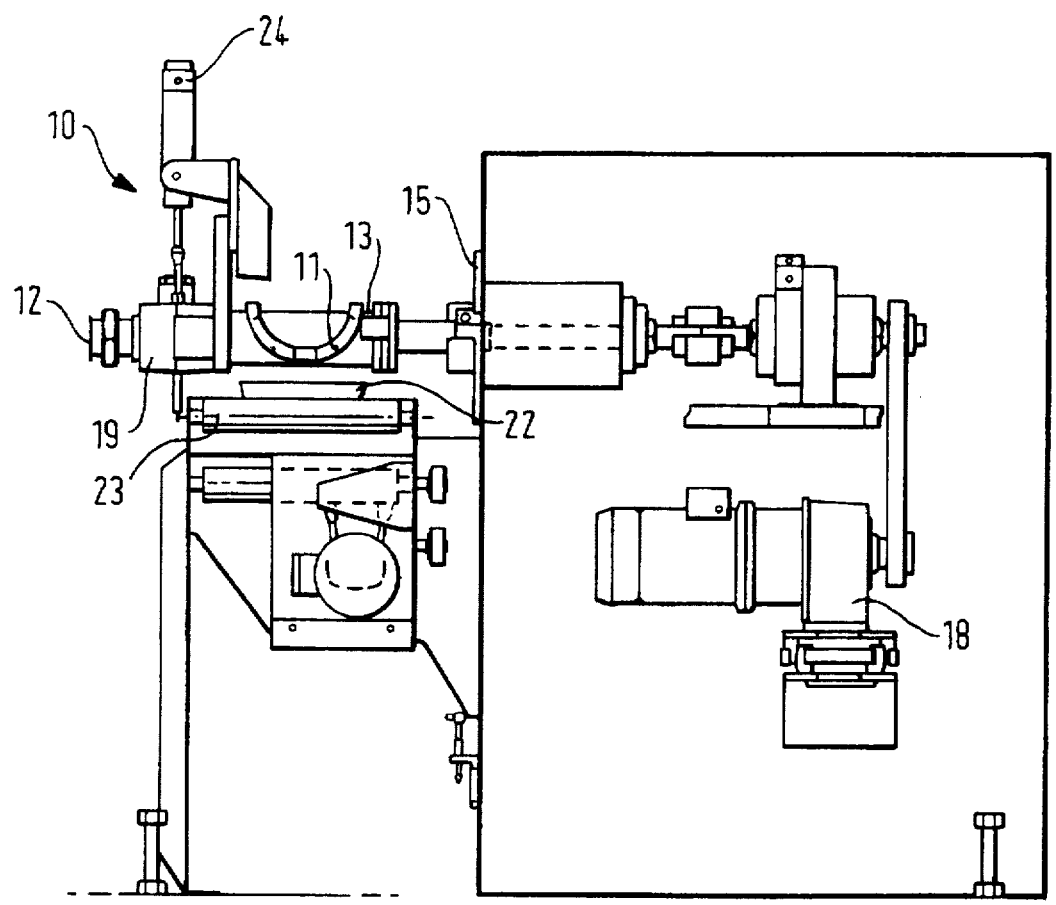
FIG. 1 shows a side view of the apparatus for dosing a pattern of food material onto a continuously moving tray.
Figure 2:
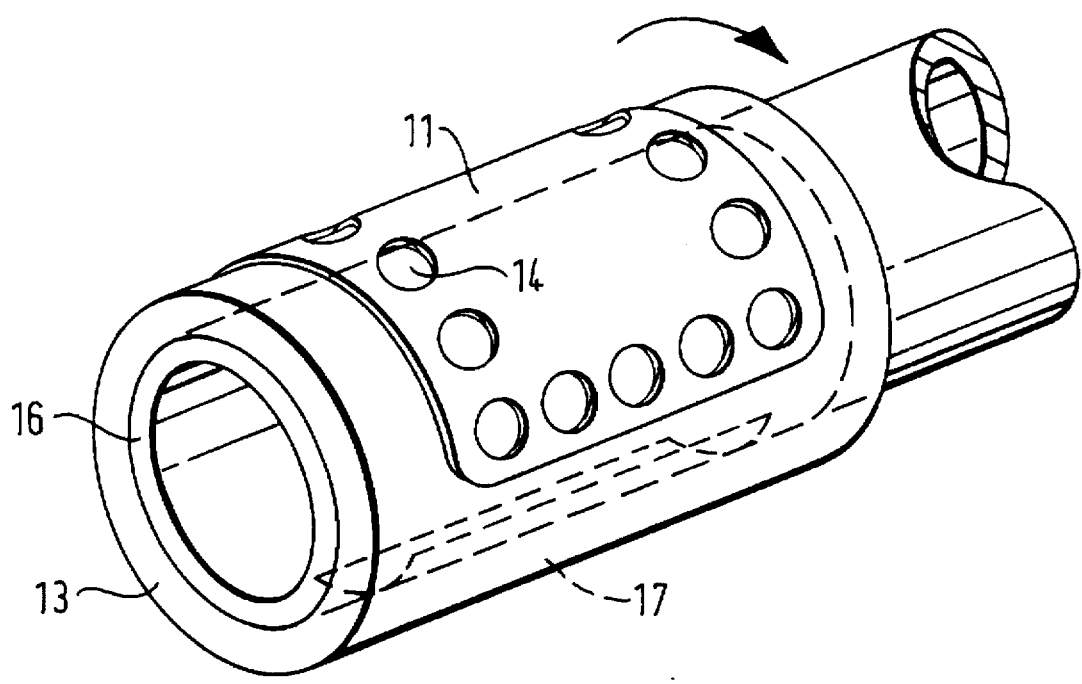
FIG. 2 shows a perspective view of the principle design of the core element and the tube element.
Figure 3:
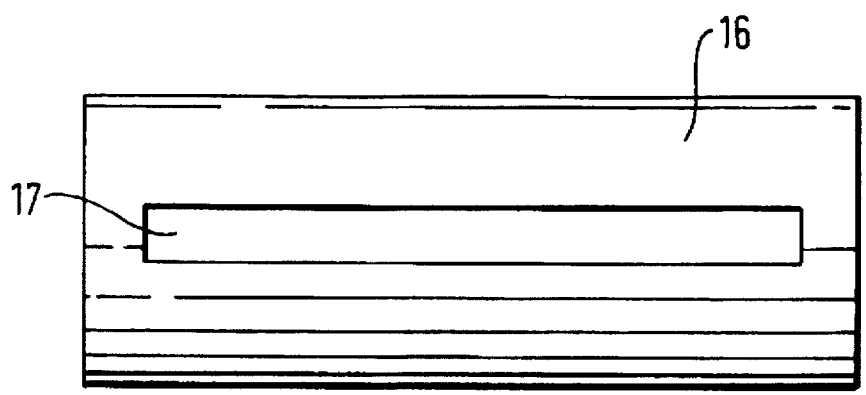
FIG. 3 shows a bottom view of the core element having a slot as discharge opening.

FIG. 1 shows an apparatus 10 having a dosing assembly 12 comprising a substantially cylindrical tube element 13. The tube element 13 includes a pattern defining area 11 which has a plurality of circumferential openings 14 (see FIGS. 4 and 5). The tube element 13 is rotatably mounted in a housing 15. A hollow core element 16 with at least one supply inlet and at least one discharge orifice 17 are positioned in the tube element 13, as illustrated in FIGS. 2 and 3. The discharge orifice 17 faces downwards, and preferably is an elongated slot extending along the longitudinal axis of the tube element 13. When the tube element 13 is rotated about its longitudinal axis the openings 14 are in turn aligned with and brought adjacent to the discharge orifice 17, and the food material introduced into the core element 16 will be discharged through the opening created by the overlapping openings 14 and the discharge opening 17.

Figure 4:
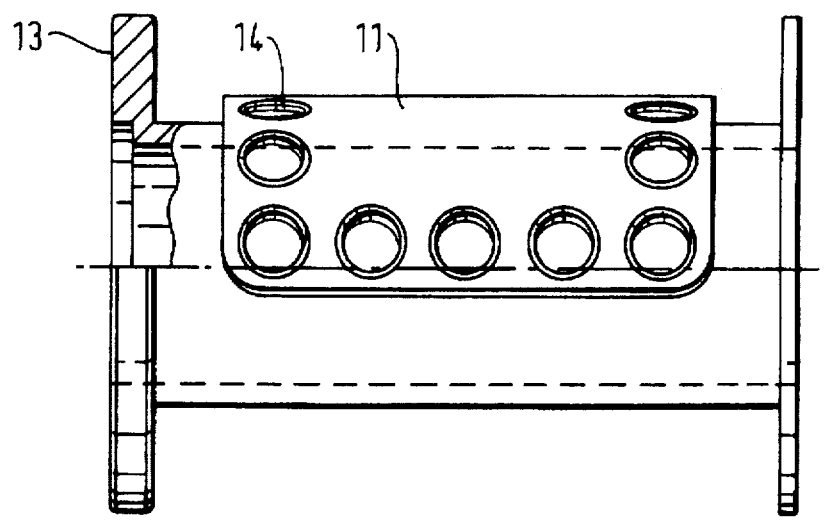
FIG. 4 shows a side view of the tube element having a pattern defining area.

The apparatus 10 further comprises supply means 19 supplying the food material 15 to the core element 16, as shown in FIG. 4. Also, supply controlling means for controlling said supply are provided but not shown in the drawings as this component is well known to one of ordinary skill in the art.

The apparatus has drive means 18 for rotating the tube element about its longitudinal axis, e.g. an AC-motor. Finally, the apparatus comprises control means, not shown in the drawings, for controlling the rotation of the tube element so that the pattern is correctly dosed onto the moved object.

FIG. 2 shows the a principle drawing of a preferred embodiment of the core element 16 in the form of a cylindrical sleeve. The cylindrical sleeve preferably fits tightly within the tube element 13. The elements of the dosing assembly 12 are advantageously made of stainless steel.

Figure 5:
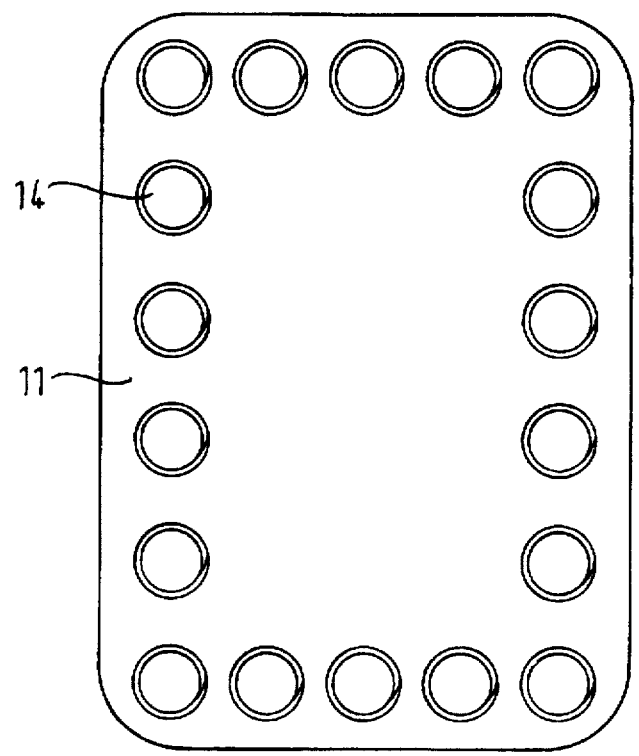
FIG. 5 illustrates an unfolded pattern defining area.

As described above, the dosing assembly 12 has only one rotating part, the tube element 13, which is of a very simple design and is mounted as the outermost element of the dosing assembly. This facilitates change of a tube element 13 and thus the pattern defined therein. The pattern defining area 11 may cover the whole periphery of the tube element 13 or part of it as shown in FIG. 5.

FIG. 6 illustrates the principle steps in a decoration in accordance with the method of the invention. The pattern in FIG. 6 may e.g. be dosed with the pattern defining area 11 shown in FIGS. 4 or 5 defining a rectangular border and two parallel lines, respectively, but any pattern which can be defined with openings 14 may be used. In the example shown, the dosing assembly is used for producing potato "duchesse" type tops of dosed mashed potato onto a tray 22 in the form of a rectangular border.

The tray 22 on the conveyer belt 23 passes a conventional sensor (not shown in the drawings). The sensor, depending on the velocity of the conveyer belt 23, activates the pump supplying the food material. When the position of the tube element 13 is project and the tray 22 is in the correct position beneath it the dosing will take place (1 and 2). The start of the rotation of the tube element 13 and the starting time of the pump can be adjusted individually in order to correct any variations which may occur.

When the tray 22 is in this position and the pump starts to supply food material, simultaneously a cylinder 24 is forwarded and activated in order to supply an extra amount of food product 25 to the normal supply of food material (2). This is done to reach the correct weight of the first row of the pattern. The adjustment of the amount supplied is necessary when a row of food material is dosed rather than being necessary e.g. with a single dot of food material. A top view of the tray 22 in position (3) is shown as 27. Now the rotation continues corresponding with the speed of the conveyer belt 23, and the side borders of the pattern are dosed(3–7). Reference 28 shows a top view of the tray 22 in position (5).

When the final end border of the pattern is to be dosed, a second cylinder 25 again supplies an extra amount to reach the correct weight of food product 26, see (8). The finished tray 22 (9) passes the dosing assembly and the cylinders 24 and 25 return to their upper position, and the pump stops. Reference 29 shows the final decorated tray 22. These steps are repeated when subsequent trays are passed beneath the dosing assembly 12.

Figure 7:
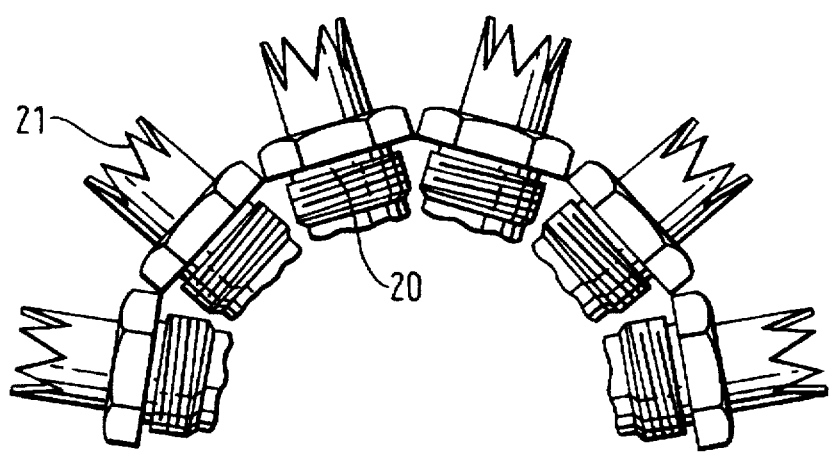
FIG. 7 shows a side view of discharging nozzles used for providing the product discharged from the dosing assembly with an attractive finish.

In FIG. 7, the nozzles 20 are shown in more detail. They give the final product discharged by the dosing assembly an attractive "hand made" appearance. The nozzles 20 have a saw toothed discharge 21 opening in order to shape the food material discharged into "duchesse" tops. Other contours may be provided to give other finish. The nozzles 20 may be mounted on the tube element 13 by means of threads or other connections.

An example of dosing assembly dimensions and velocities which conveniently can be used are as follows: the tube element 13 may have e.g. an outer diameter of 100 mm, the rotation speed should be adjusted to the conveyor speed which conveniently is 30 m/min.. The length of the trays or food material should not be more than the circumference of the tube element, if the whole length of the tray is to be decorated by one rotation of the tube element. Preferably, the pattern defining area covers only 270° of the circumference while the remaining part of the rotation allows the recently decorated tray to pass the dosing assembly and a new tray to be forwarded. With the mentioned conveyer speed about 80 trays may be decorated in one minute. The supply of food material may be for example 14 kg/min.

What is claimed is:

1. An apparatus for dosing a pattern of food material onto an object continuously moved relative to the apparatus, said apparatus comprising a dosing assembly comprising a substantially cylindrical tube element having a plurality of circumferential openings defining the pattern and being mounted rotatably; and a hollow core element with at least one supply inlet and at least one discharge orifice, the core element being positioned substantially in the tube element with the discharge orifice facing downwardly, so that when the tube element is rotated about its longitudinal axis the openings are in turn aligned with and brought adjacent to the discharge orifice allowing food material introduced into the core element to be discharged through the opening created, supply means for the supply of the food material to the core element and supply controlling means for controlling said supply, drive means for rotating the tube element about its longitudinal axis, and control means for controlling the rotation of the tube element so that the pattern is correctly dosed onto the moved object.

2. An apparatus according to claim 1, wherein the core element is a cylindrical sleeve substantially coaxially fitted within the tube element.

3. An apparatus according to claim 1, wherein the discharge orifice is an elongated slot extending substantially along the longitudinal axis the tube element.

4. An apparatus according to claim 1, wherein the apparatus further is provided with conveyor means for transporting objects to be applied with a pattern of food material.

5. An apparatus according to claim 1, wherein the openings in the tube element define a plurality of patterns.

6. An apparatus according to claim 1, wherein the openings are arranged so that the pattern defined is a substantially rectangular border.

7. An apparatus according to claim 1, wherein the openings in the tube element are provided with a nozzle, respectively, defining the shape of the dosed food material.

* * * * *